United States Patent
Adinarayan et al.

(10) Patent No.: US 10,438,245 B2
(45) Date of Patent: Oct. 8, 2019

(54) PERSONALIZED MARKETING INCENTIVES BASED ON HISTORICAL INFORMATION AND MOBILITY MONITORING

(71) Applicant: International Business Machines Corporation, Armonk, NY (US)

(72) Inventors: Geetha Adinarayan, Bangalore (IN); Shaw-Ben S. Shi, Austin, TX (US); Gandhi Sivakumar, Bentleigh (AU); Meng Hong Tsai, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 14/870,479

(22) Filed: Sep. 30, 2015

(65) Prior Publication Data

US 2017/0091823 A1    Mar. 30, 2017

(51) Int. Cl.
    *G06Q 30/02*    (2012.01)
    *H04W 4/04*    (2009.01)

(52) U.S. Cl.
    CPC ..... *G06Q 30/0269* (2013.01); *G06Q 30/0267* (2013.01); *H04W 4/043* (2013.01)

(58) Field of Classification Search
    CPC .......... G06Q 30/0269; G06Q 30/0267; H04W 4/043
    USPC ............... 705/14.53, 14.58, 14.23, 14.13, 44
    See application file for complete search history.

(56) References Cited

U.S. PATENT DOCUMENTS

| | | | |
|---|---|---|---|
| 7,853,477 B2 | 12/2010 | O'Shea et al. | |
| 8,050,984 B2 | 11/2011 | Bonner et al. | |
| 8,229,787 B2 | 7/2012 | Ramchandani et al. | |
| 2008/0154725 A1 | 6/2008 | Flake et al. | |
| 2008/0167964 A1* | 7/2008 | Chefalas | G06Q 30/02 705/14.23 |
| 2010/0087211 A1 | 4/2010 | Hurd | |
| 2011/0082729 A1* | 4/2011 | Carvallo | G06Q 30/02 705/14.13 |
| 2011/0106624 A1* | 5/2011 | Bonner | G06Q 30/0261 705/14.58 |

(Continued)

FOREIGN PATENT DOCUMENTS

JP    2001256339 A  *  9/2001

OTHER PUBLICATIONS

Stefan Poslad, Using a Smart City IoT to Incentivise and Target Shifts in Mobility Behaviour, 2015 (Year: 2015).*

(Continued)

*Primary Examiner* — Tarek Elchanti
(74) *Attorney, Agent, or Firm* — Daniel R. Simek

(57) ABSTRACT

One embodiment for determining a marketing incentive for a user of an electronic device. In one embodiment, a computer processor detects a first electronic device within a retail environment utilizing a second electronic device that also identifies information associated with the first electronic device. In one embodiment, a computer processor determines a behavior associated with the first electronic device based, at least in part, on movement of the first electronic device within the retail environment. In one embodiment, a computer processor identifies data associated with the retail environment that includes information associated with a retailer associated with the retail environment and information associated with the first electronic device. In one embodiment, a computer processor determines a first marketing incentive based, at least in part, on the determined behavior associated with the first electronic device and the identified data associated with the retail environment.

16 Claims, 5 Drawing Sheets

(56) References Cited

U.S. PATENT DOCUMENTS

| | | | | |
|---|---|---|---|---|
| 2013/0268357 | A1* | 10/2013 | Heath | H04L 63/00 |
| | | | | 705/14.53 |
| 2014/0379580 | A1* | 12/2014 | Varma | G06Q 30/06 |
| | | | | 705/44 |
| 2016/0180393 | A1* | 6/2016 | Mulye | G06Q 30/0261 |
| | | | | 705/14.58 |
| 2016/0232559 | A1* | 8/2016 | Tezuka | G06Q 30/02 |

OTHER PUBLICATIONS

Aalto, et al., "Bluetooth and WAP Push Based Location-Aware Mobile Advertising System", MobiSYS'04, Jun. 6-9, 2004, Boston, Massachusetts, Copyright 2004 ACM, 10 pages.

Miles, Stephanie, "8 Tools to Send Messages to Shoppers Based on In-Store Movements", Street Fight, Copyright © 2015 Hyperlocal Industries, Apr. 21, 2014, 3 pages, <http://streetfightmag.com/2014/04/21/8-tools-to-send-messages-to-shoppers-based-on-in-store-movements/>.

Ye, Jason Yipin, "Atlantis: Location Based Services with Bluetooth", Department of Computer Science, Brown University, Printed Jul. 1, 2015, 8 pages.

Zafari, et al., "Micro-Location for Internet of Things equipped Smart Buidings", printed Sep. 24, 2015, 16 pages.

List of IBM Patents or Patent Applications Treated as Related, Appendix P, Filed Herewith, 2 pages.

Adinarayan, et al., "Personalized Marketing Incentives Based on Historical Information and Mobility Monitoring", U.S. Appl. No. 15/623,479, filed Jun. 15, 2017.

\* cited by examiner

PERSONALIZED MARKETING INCENTIVES BASED ON HISTORICAL INFORMATION AND MOBILITY MONITORING

BACKGROUND OF THE INVENTION

The present invention relates generally to the field of marketing, and more particularly to providing a customer, utilizing a mobile device, an incentive to influence purchases.

Developments in cellular and computing technology have resulted in proliferation of smart mobile electronic devices, such as smartphones, tablet computers, and wearable devices with advanced capabilities, such as digital eyeglasses (e.g., smart glasses) and smart watches. Mobile devices contribute to the growing network of social interactions and the connectedness of users. Businesses look to these mobile devices as a conduit to users to improve sales.

Proximity marketing is the localized wireless distribution of advertising content associated with a particular place. Information can be received by individuals in that location who wish to receive them and have the necessary equipment to do so. Location based services (LBS) have similar concepts that can make use of a user's position to provide various services, such as actual traffic information and listings of restaurants close by. Typically, these services are based on positioning systems such as global positioning system (GPS) or information from the mobile communication network such as global system for mobile communications (GSMT™).

Alternatively, an indoor positioning system (IPS) can locate mobile devices, objects and/or people inside a building using radio waves, magnetic fields, acoustic signals, or other sensory information collected by mobile devices. IPS solutions can rely on different technologies, such as distance measurement to nearby anchor nodes with known positions (e.g., wireless local area network access points), magnetic positioning, or dead reckoning. IPS solutions can actively locate mobile devices and tags, or provide an ambient location or an environmental context for devices that are sensed (i.e., detected).

SUMMARY

According to aspects of the present invention, there is a method, computer program product, and/or system for determining a marketing incentive for a user of an electronic device. In one embodiment, a computer processor detects a first electronic device within a retail environment, wherein the first electronic device is detected utilizing a second electronic device that identifies information associated with the first electronic device. In one embodiment, a computer processor determines a behavior associated with the first electronic device based, at least in part, on movement of the first electronic device within the retail environment. In one embodiment, a computer processor identifies data associated with the retail environment, wherein the identified data associated with the retail environment includes information associated with a retailer associated with the retail environment and information associated with the first electronic device. In one embodiment, a computer processor determines a first marketing incentive based, at least in part, on the determined behavior associated with the first electronic device and the identified data associated with the retail environment.

DETAILED DESCRIPTION

Figure 1:
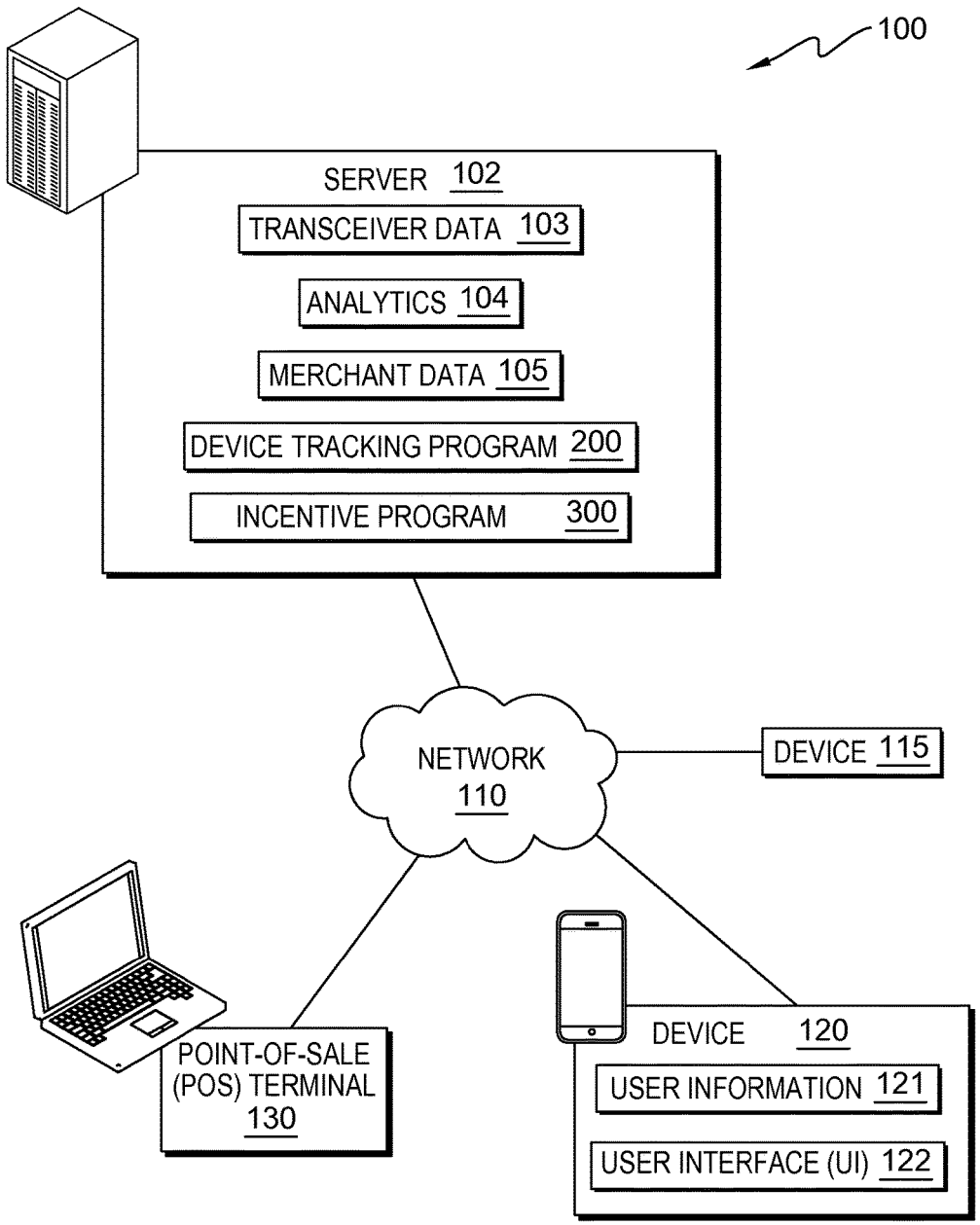
FIG. 1 illustrates a distributed computing environment, in accordance with an embodiment of the present invention.

Embodiments of the present invention recognize that understanding and influencing consumer behavior in real time is an increasingly important focus area for organizations and their information technology (IT) providers. Use of indoor positioning systems (IPSs) and communicating to unique customers (e.g. users) is an active area (e.g., sale, marketing) for many organizations. Technologies and tools that enable organizations and/or businesses to detect unique customers and determine customers' locations and movements within a designated environment are growing in pervasiveness and business value, as they allow organizations and/or businesses to perform web-type analytics for physical venues and deliver customer-centric (e.g., incentives, promotional, cross-marketing, loyalty, etc.) offers. Embodiments of the present invention recognize that predictive modeling analytics and machine learning can be utilized to customize incentives that are communicated to a customer.

Embodiments of the present invention can be utilized by a plurality of entities, such as organizations, retailers, businesses, and or proprietors, herein identified as a/the merchant, operating within various venue and/or environments. Embodiments of the present invention utilize an IPS that may more accurately determine the position of a user's mobile device. The range of various wireless technologies is identified by standards of the Institute of Electrical and Electronics Engineers (IEEE). In an indoor example, the maximum range of an electronic device based on IEEE 802.11ac is 35 meters and a device based on IEEE 802.11ad is a couple of meters. The accuracy for determining a distance (e.g., a position) to a wirelessly communicating electronic device is affected by the wireless technology utilized. Some IPS solutions utilize technologies that consume less energy and can more easily establish connections with other electronic devices both mobile and stationary. For example, Bluetooth® Low Energy may have a positional accuracy of 10 centimeters as opposed to a wireless local area network (WLAN) that may have a positional accuracy of a meter or more. Embodiments of the present invention also enable a merchant (e.g., a retailer) of the shopping venue (e.g., retail environment) to further divide (e.g., geo-fence) an area monitored by an electronic device (e.g., transceiver, beacon, etc.) into one or more zones that are described by distance semantics, such as a window shopping area, a promotional area, and a checkout area.

One embodiment of the present invention communicates marketing incentives to a customer via a WLAN of a merchant, within a shopping venue. For example, a merchant may communicate an incentive to a customer via a merchant application (app) installed on a mobile device of a user (e.g., customer). In another example, a merchant may communicate an incentive to a customer via instant messaging app installed on a mobile device of a user. In another embodiment of the present invention communicates marketing incentives to a customer via another wireless communication technology (e.g., a telephony system) on a mobile device of the customer.

Other embodiments of the present may invention integrate communication functions with an IPS to: identify a mobile device of a customer, track the mobile device of the customer, and communicate incentives to the mobile device of the customer. An embodiment of the present invention, communicates marketing invectives to a customer via a mobile device, such as a smart cart or a scanner (e.g., had-held scanner) provided by the shopping venue (e.g., a retail environment, a merchant). In an embodiment of the present invention, incentives are communicated to a point-of-sales (POS) terminal utilized by a customer (e.g., an automated checkout station, a self-checkout station) or for a POS terminal (e.g., register) supported by a customer service representative (e.g., cashier). Various embodiments of the present invention include modules that comprise an IPS which may include: a transceiver, a beacon, a wireless hot-spot, a kiosk, a POS, etc. to determine the mobility of a customer and/or communicate incentives to the mobile device of the customer. In some embodiments of the present invention the transceivers (e.g., beacons) may be distributed across a shopping venue to provide monitoring that can blanket the shopping venue which may be comprised of one or more retail environments. Other embodiments of the present invention may utilize transceivers to localized and/or partition areas, such as a retail areas specific to a merchant, departments within the retail environment of the merchant, and/or specific areas of merchandise of the merchant.

Embodiments of the present invention can apply predictive modeling analytics to purchasing behaviors of a customer (e.g., time and date, demographics, purchasing history, response to incentives, etc.), which may be utilized to determine an incentive that is communicated to a customer. In addition, embodiments of the present invention analyze the mobility of a mobile device (e.g., a user, a customer) within a shopping venue (e.g., a retail environment). Embodiments of the present invention may define mobility in terms of: time, distance, direction of movement (e.g., approaching, receding, stationary), and speed of movement. Mobility data associated with a mobile device may be utilized as another input to predictive modeling analytics to determine a context for a current behavior of a customer, and refine an incentive communicated to the customer to influence the purchasing behavior of the customer. Additional embodiments of the present invention also may also incorporate technologies that can determine the physical location and direction of movement of a mobile device, in at least two dimensions, as opposed to a radial distance from a transceiver.

Some embodiments of the present invention include merchant information as other inputs to predictive modeling analytics for determining an incentive to offer a customer. Merchant data that may be utilized by predictive analytics in the determination of incentive include information related to merchandise inventories. An embodiment of the present invention may include a segmentation analysis to determine the effectiveness of marketing campaigns to up-sell or cross sell merchandise and/or services. Another embodiment of the present invention may utilize analytics to generate marketing incentives that include an urgency factor. In one example, analytics may indicate that a customer may respond positively to an incentive with a time constraint. In another example, analytics may determine that based on information available for a plurality of customers within a retail environment that a marketing incentive that employs a competitive constraint, such as the next twenty purchases of an items gain an additional discount.

The descriptions of the various scenarios, instances, and examples related to the present invention have been presented for purposes of illustration but are not intended to be exhaustive or limited to the embodiments disclosed. Alternative embodiments of the present invention may be utilized in other venues and/or environments that include transceivers and/or beacons that can monitor the mobility of a user. For example, embodiments of the present invention may be utilized within: a trade show, a convention, a special event (e.g., pet show, bridal show, a festival), a fair, a carnival, a business district, etc. In this example, each vendor area/booth may utilize a beacon to monitor the mobility of a user in and around a vendor area/booth. Embodiments of the present invention provide for locating and communicating with mobile devices in indoor positioning systems. Although the present invention describes a solution for an indoor positioning system, a person skilled in the art will recognize that this invention will apply to any designated environment (e.g., outdoor marketplace, subway stations, parking lots, sports venues) that uses a positioning system with a network that may or may not rely on global positioning system (GPS) satellites.

The present invention will now be described in detail with reference to the Figures. FIG. 1 is a functional block diagram illustrating distributed computing environment 100 in an embodiment, in accordance with the present invention. An embodiment, distributed computing environment 100 includes: server 102, device 115, device 120, and point-of-sale (POS) terminal 130, all interconnected over network 110. In some embodiments, distributed computing environment 100 may include multiple instances of device 115. Many modifications to the depicted environment may be made by those skilled in the art without departing from the scope of the invention as recited by the claims.

Server 102, device 115, device 120, and POS terminal 130 may be: laptop computers, tablet computers, netbook computers, personal computers (PC), desktop computers, personal digital assistants (PDA), smart phones, wearable devices (e.g., digital eyeglasses, smart glasses, smart watches, personal fitness devices, personal safety devices), or any programmable computer systems known in the art. In certain embodiments, server 102, device 120, and POS terminal 130 represent computer systems utilizing clustered computers and components (e.g., database server computers, application server computers, etc.) that act as a single pool of seamless resources when accessed through network 110, as is common in data centers and with cloud-computing applications. In general, server 102, device 115, device 120, and POS terminal 130 are representative of any programmable electronic device or combination of programmable electronic devices capable of executing machine readable program instructions and communicating with users of server 102, device 115, device 120, and POS terminal 130, via network 110. Server 102, device 115, device 120, and POS terminal 130 may include components, as depicted and described in further detail with respect to FIG. 5, in accordance with embodiments of the present invention.

Server 102 includes: transceiver data 103, analytics 104, merchant data 105, device tracking program 200, incentive program 300, and various programs and databases (e.g., a website interface, geo-locating software, e-mail server, enterprise resource planning, speech recognition software, etc.) (not shown).

Transceiver data 103 includes files, tables, and databases that include identifiers for device 115, POS terminal 130, and other devices of an IPS (not shown) utilized by server 102. In an embodiment, transceiver data 103 also includes the distance semantics corresponding to device 115 and POS terminal 130. In some embodiments, transceiver data 103 also includes a map of a shopping venue (e.g., a retail environment) and a cross-reference linked to merchant data 105 that identifies one or more locations of merchandise within a shopping venue. In other embodiments, transceiver data 103 includes a cross-reference linked to merchant data 105 that identifies one or more items of merchandise by RFID tags associated with the merchandise. In various embodiments, transceiver data 103 may be dynamically modified based on merchant data 105 and/or merchandise including RFID tags that may be detected by a transceiver (e.g., device 115). In an example, merchandise around device 115 is depleted and consolidated to a smaller area. Transceiver data 103 for device 115 may be affected (e.g., one or more zones shrink).

Analytics 104 includes a suite of software capable of predictive modeling analytics, machine learning, statistical analysis, database searches, fuzzy logic, etc. In some embodiments, analytics 104 may also include various business analytics, such as behavioral analytics, cohort analytics, marketing analytics, pricing analytics, retail analytics, etc. For example, analytics 104 may utilize behavior analytics to characterize a user based on location, direction, duration and history; such as a roaming customer (e.g., long distance, short stays, random paths); a bargain hunter (e.g., long stays, sales and clearance zones); and trend setter (e.g., regular price zone, long duration, frequent purchases, paths traverse related merchandise and/or accessories). In an alternative embodiment, analytics 104 is a purchased software solution hosted on another computing system (not shown) that is accessible via network 110.

In other embodiments, analytics 104 utilizes transceiver data 103, merchant data 105, and user mobility data determined by device tracking program 200 to determine one or more incentives that are communicated to device 120. In one embodiment, analytics 104 determines one or more incentives based on real-time monitoring of a user within a shopping venue (e.g., retail environment). In another embodiment, analytics 104 dynamically determines incentives that are customized for a user. In various embodiments, analytics 104 may include one or more algorithms developed by a merchant. In another embodiment, analytics 104 utilizes parameters and lookup tables within merchant data 105 to select an incentive from predefined incentives of a merchant based on a mobility and a behavior associated with a user. In an example, analytics 104 may include an algorithm that calculates an incentive index (IIDX), which utilizes time of stay (ToS), distance from device 115 (D), and an average value of prior purchases (PPavg) as inputs. One instance of the IIDX algorithm may be defined as: IIDX= $((ToS)^2/D)+PPavg^2$. In another instance, an IIDX algorithm may utilize analytics 104 to generate a more granular index value. For example, IIDX may obtain ToS, D, and PPavg information relative to a department within a shopping venue, such as clothing for men.

Analytics 104 utilizes identifying information obtained about a mobile device, mobility and/or behavioral data associated with the mobile device, and merchant data to determine a marketing incentive that is communicated to the mobile device. In one embodiment, analytics 104 uses a purchasing history of the user as an input for determining an incentive. In another embodiment, analytics 104 may be constrained to using an identifier for device 120 as opposed to an identity of a user. In one scenario, analytics 104 may infer an identity of a user based on electronic payment information or merchant card information obtained by POS terminal 130 when a user pays for merchandise with the credit card or merchant card. In another scenario, analytics 104 is limited to obtaining a purchase history associated with the identifier of device 120.

Merchant data 105 includes merchandise inventory information and customer information. In one embodiment, merchant data 105 includes merchandise information and/or inventory data such as, a quantity for items (e.g., merchandise) that are stocked by a shopping venue, a price for the items that are stocked, a status (e.g., on order, clearance, backordered, discontinued, promotional, etc.) for stocked items, cross-marketing information among stocked items, supplier discounts for stocked items, rebates for stocked items, etc. In various embodiments, merchant data 105 includes inventory data associated with one or more shopping venues of a merchant, such as warehoused inventory, stocked inventory that is not displayed, and/or inventory of another shopping venue (e.g., another store of a chain of stores). In addition, merchant data 105 may include a map (e.g., floor plan) of a shopping venue that identifies the locations of stocked items. In one scenario, a map of the shopping venue may be communicated to device 120 to improve the shopping experience of a user. In another scenario, a map of some of a shopping venue or the entire shopping venue may be communicated to a user via electronic signage that detects device 120 and/or an incentive determined for the user.

In another embodiment, merchant data 105 includes historical information for a plurality of users (e.g., customers, shoppers, mobile devices, etc.). Historical information may include: demographic information, a purchasing history of merchandise (e.g., color, size, date, cost, etc.), merchandise tracked by a user (e.g., a wish list), responsiveness to various incentives (e.g., percent discounts, cash back, loyalty points, bundled items, etc.), and/or other information (e.g., a level of impulse buying) determined by analytics 104 for a user. In a further embodiment, historical information may include aggregated purchasing history for a user across a plurality of venues of a merchant (e.g., retailer), such as but not limited to other retail environments (e.g., stores, franchises) of the merchant, on-line shopping websites of the merchant, and/or related shopping venues (e.g., other retailers and/or franchises of a parent company).

In addition, an embodiment of may also include information obtained from one or more social networking applications. For example, a user "liked" an item of merchandise and submitted a positive review of the item. In various embodiments, merchant data 105 includes information related to a current marketing initiative, such as a back-to-school sale or a holiday (e.g., Labor day) sale. In one scenario, merchant data 105 includes a purchasing history corresponding to an identity of user that utilizes device 120. For example, a user of device 120 "opted-in" to a rewards program of a merchant (e.g., utilizes a credit card of a merchant, receives e-mail marketing information, etc.). In another example, merchant data 105 identifies the identity of a user based on a software application of a merchant installed on device 120. In another scenario, merchant data 105 includes a purchasing history associated with a mobile device (e.g., device 120). In some scenarios, merchant data 105 includes a cross-reference of users that utilize device 120. For example, two siblings share mobile device 120.

In some embodiments, merchant data 105 includes mobility data for a plurality of users. The mobility data for the plurality of users may be stored in a database so that mobility data may be sorted based on one or more parameters, such as time of year, demographics, shopping venue location, etc. In various embodiments, merchant data 105 includes parameters and/or algorithms that are used to fully quality or partially quantify a behavior of a user for input to analytics 104. In some embodiments, merchant data 105 affects the information in transceiver data 103, such as including algorithms that can dynamically modify distance semantics based on one or more conditions. In one example, transceiver data 103 (e.g., a size of one or more zones, or distance semantics associated with one or more zones), corresponding to device 115, is modified (e.g., grows, shrinks, reapportions, etc.) based on inventory information within merchant data 105. In other embodiments, merchant data 105 may include parameters and/or lookup tables (e.g., matrix, array) that are utilized by analytics 104 to determine an incentive. In one example, merchant data 105 may include a lookup table (e.g., a 2-D array) comprised of merchandise in one axis and IIDX values in the other axis. In another example, merchant data 105 may include a lookup table (e.g., a 3-D matrix) comprised of merchandise in one axis, IIDX values in a second axis, and distance semantics in a third axis.

In one embodiment, server 102, communicates through network 110 to device 115, device 120, and POS terminal 130. Network 110 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 110 can be any combination of connections and protocols that will support communications between server 102, device 115, device 120, and POS terminal 130, in accordance with embodiments of the present invention. In some scenarios, server 102 utilizes network 110 to access one or more instances of device 115 to communicate with device 120. In another embodiment, network 110 operates locally via wired, wireless, or optical connections and can be any combination of connections and protocols (e.g., personal area network (PAN), near field communication (NFC), laser, infrared, ultrasonic, etc.).

Device 115 is a device that can communicate wirelessly with device 120 and can determine the mobility of device 120. Device 115 communicates the mobility data to server 102 via network 110. Dependent on security settings and/or active software apps, device 115 may not be able to determine an identity for the user of device 120. Device 115 may be limited to determining an identity for device 120. In one embodiment, device 115 is an electronic device, such as a beacon or a sensor that is limited to 1-way communication with respect to device 120. In an example, device 115 determines the mobility data for device 120 and an identity for the user of device 120, and communicates the mobility data and identity data associated with device 120 to device tracking program 200. In another embodiment, device 115 is an electronic device, such as a transceiver that is capable of communicating with device 120, server 102, and other electronics devices (e.g., RFID tags). Device 115 determines the mobility data for device 120 and an identity for the user of device 120 and communicates the mobility data and identity data associated with device 120 to device tracking program 200. In addition, device 115 may communicate incentives, generated by incentive program 300, to device 120.

In a further embodiment, device 115 includes electronics that enable device 115 to determine the physical location and direction of movement of device 120, in at least two dimensions, as opposed to a radial distance to device 120 that is relative to device 115. In some embodiments, device 115 also includes various algorithms to determine an angle of arrival (AoA) and/or a direction of arrival (DoA) of device 120 relative to one or more zones defined within transceiver data 103 for device 115. In other embodiments, device 115 communicates mobility data (e.g., signal strength, AoA) to server 102, where server 102 utilizes one or more algorithms to determine additional mobility data (e.g., ToS, DoA, speed, etc.) for device 120.

Device 120 may include: user information 121, user interface (UI) 122 and various programs (not shown). Examples of programs that device 120 may include are: a web browser, an e-mail client, security software (e.g., a firewall program, a geo-locating program, an encryption program, etc.), an instant messaging (IM) application (app), and a communication (e.g., phone) application. A user of device 120 can interact with the respective UI 122 via a singular interface device, such as a touch screen (e.g., display) that performs both input to a graphical user interface (GUI) and as an output device (e.g., a display) presenting a plurality of icons associated with software applications or images depicting the executing software application. Optionally, a software application (e.g., a web browser) can generate UI 122 operating within the GUI of device 120. In some instances, a software program (e.g., an e-mail client) may utilize the display of device 120 to display an incentive offer (e.g., coupon). For example, device 120 may receive an incentive from server 102 in the form of a quick response code (QR code) that is scanned at POS terminal 130 to certify the individualized incentive communicated to device 120.

In one embodiment, user information 121 includes security settings for device 120, such as authentication information and protocols (e.g., encryption schemes) utilized during communications (e.g., with network 110, server 102, etc.). In another embodiment, user information 121 includes one or more identities of user, such as user profiles. User information 121 may include information associated with a subscriber identity module (SIM) card of device 120. In some embodiments, user information 121 may also include encrypted and/or anonymized merchant account information, electronic payment information (e.g., a digital wallet), etc.

UI 122 accepts input from a plurality of input/output (I/O) devices including, but not limited to, a tactile sensor interface (e.g., a touch screen, a touchpad) or a natural user interface (e.g., voice control unit, motion capture device, etc.). An I/O device interfacing with a UI 122 may be connected to an instance of device 120, which may operate utilizing a wired connection, such as a universal serial bus port (USB™ port) or wireless network communications (e.g., infrared, NFC, etc.). For example, an I/O device may be a peripheral, such as a keyboard, a mouse, a trackball, or a click wheel that provides input from a user. A user may utilize UI 122 interface screen generated by device tracking program 200. In one embodiment, UI 122 is generated by a software app, of a merchant, that is installed on device 120. In another embodiment, UI 122 is generated by a web-based app (e.g., an e-commerce site) that is associated with the shopping venue and/or for presenting incentives to a user of device 120.

Device tracking program 200 determines the mobility of a user of device 120 within a shopping venue. Device tracking program 200 bases the mobility of a user (e.g., device 120) on the movements of device 120 relative to one or more instances of device 115. Device tracking program 200 communicates an incentive, based on the determined mobility data of a user, to device 120. Device tracking program 200 may further analyze the mobility of device 120 to determine a behavior for a user, based on zones that are defined relative to an instance of device 115. In some embodiments, device tracking program 200 can communicate marketing incentives to device 120. In other embodiments, device tracking program 200 communicates marketing incentives to another electronic device, such as POS terminal 130 where the marketing incentive is communicated to the user of device 120.

Incentive program 300 utilizes the mobility data and determined behaviors of a user to determine a marketing incentive to communicate to a user of device 120. Incentive program 300 may also include various merchant data, such as merchandise inventory and a purchase history of a user, when determining a marketing incentive for the user, in accordance with embodiments of the present invention. In some embodiments, incentive program 300 cannot determine the identity of a user of device 120 and determine a marketing incentive based on information (e.g., mobility data, a behavior, purchase history, etc.) corresponding to device 120.

Figure 2:
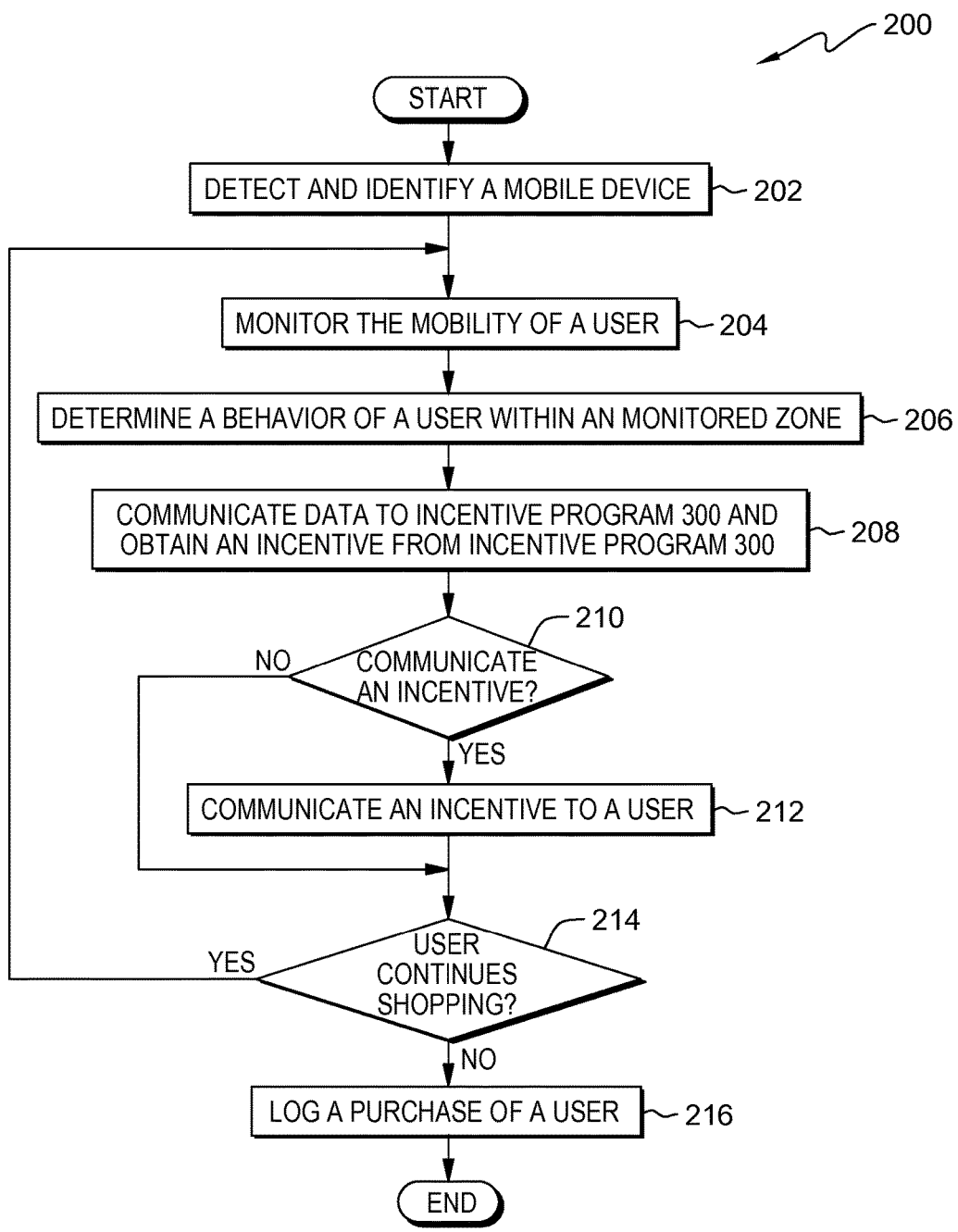
FIG. 2 depicts a flowchart of the operational steps of a device tracking program, in accordance with an embodiment of the present invention.

FIG. 2 is a flowchart depicting operational steps for device tracking program 200, a program that monitors the mobility of a user associated with device 120, within a shopping venue. In addition, device tracking program 200 communicates incentives, received from incentive program 300, to device 120, in accordance with embodiments of the present invention. Device tracking program 200 may further analyze the mobility of device 120 to determine a behavior for a user, based on zones that are defined relative to an instance of device 115. In some embodiments, device tracking program 200 communicates marketing incentives to another electronic device, such as POS terminal 130 as opposed to device 120.

In step 202, device tracking program 200 detects and identifies a mobile device. In an embodiment, device tracking program 200 may query device 120 for a unique identifier. In another embodiment, device tracking program 200 utilizes a wireless network detector, packet sniffer, neighborhood discovery protocol, etc., to determine an identity for device 120. In some embodiments, device tracking program 200 utilizes network 110 to determine the identity of device 120 utilizing a wireless-based positioning system (WPS). For example, network 110 may utilize one or more instances of device 115 (e.g., a beacon) to obtain information associated with device 120 that is utilized by a WPS. In an embodiment, device tracking program 200 "fingerprints" device 120. A device fingerprint is information collected about a remote computing device for the purpose of identification. Device tracking program 200 can utilize fingerprints to fully identify or partially identify individual users or devices even when cookies are turned off. For example, device tracking program 200 may determine information associated with device 120, such as a service set identifier (SSID), a wireless communication media access control (MAC) address, a Bluetooth® MAC address, and/or other identifiers. Another identifier that device 120 can utilize is a universally unique identifier (UUID). The UUID may be associated with a communication device within device 120 or the UUID may be embedded in a subscriber identity module (SIM) card within device 120.

Referring to step 202 in other embodiments, device tracking program 200 determines an identity of a user and/or an identity of device 120 by one or more software applications that execute on device 120, such as a merchant application, a social media application, a digital payment feature, etc. In an embodiment, device tracking program 200 determines an identity of a user of device 120 by accessing user information 121. In another embodiment, device tracking program 200 identifies a user of device 120 based on previous purchases. In one scenario, device tracking program 200 previously detected device 120 during a shopping trip and obtained an identifier for device 120. During another shopping trip, device tracking program 200 determined, via merchant data 105, that a user of device 120 utilized an electronic payment method (e.g., credit card, debit card, digital wallet, etc.) that includes an identity of a user. In another scenario, device tracking program 200 may determine the identity of a user based on a rewards card of a merchant. In one example, device tracking program 200 obtains an ID for device 120 upon entering a shopping area of a merchant. Subsequently, device tracking program 200 determines the identity of a user of device 120 based in a scan of a rewards card of the merchant to obtain electronically printed coupons (e.g., e-coupons). In another example, device tracking program 200 determines the identity of a user of device 120 based on a rewards card of a merchant that includes a RFID chip that contains the identity of a user or an ID for a user that may be cross-referenced with user identities within merchant data 105. In some embodiments, device tracking program 200 may infer that the identity of a user associated with another shopping trip is the identity of the user traveling with device 120 of a current shopping trip. In other embodiments, device tracking program 200 is constrained to identify device 120 by an identifier obtained from device 120 as opposed to determining the identity of a user of device 120.

In step 204, device tracking program 200 monitors the mobility of a user. In an embodiment, device tracking program 200 monitors the mobility of a user (e.g., device 120) via device 115. In some embodiments, device tracking program 200 may utilize localization techniques that determine the position of device 120 via measuring the intensity of the received signal (received signal strength or RSS) corresponding to various wireless access points. Device tracking program 200 may identify geo-locating parameters for device 120 that may include: the service set identifier (SSID) of device 120, a wireless communication media access control (MAC) address for device 120, and a Bluetooth® MAC address for device 120. In one instance, the accuracy of the location of device 120, determined by device tracking program 200, may depend on the number of positions that have been entered into the location database (e.g., locations of beacons) of an IPS. In other instances, the locational accuracy of device tracking program 200 is affected by which wireless technology utilized to locate device 120.

In a further embodiment, device tracking program 200 utilizes various algorithms to determine the angle of arrival (AoA) and/or direction of arrival (DoA) of device 120 with respect to one or more zones associated with a transceiver (e.g., device 115, POS terminal 130). Other embodiments of the present invention may utilizes smart objects and/or radio-frequency identification (RFID) tags associated with merchandise (e.g., attached to, imbedded within, etc.) to determine the mobility of a customer and/or the merchandise traveling with device 120 (e.g., a customer). In an alternative embodiment, device tracking program 200 utilizes an IPS to monitor the mobility of a user.

In step 206, device tracking program 200 determines a behavior of a user within a monitored zone. In an embodiment, device tracking program 200 obtains a definition for a monitored zone from transceiver data 103. For example, a monitored zone may include one or more areas surrounding device 115 (e.g., transceiver, beacon, POS terminal, etc.). In some embodiments, (referring to FIG. 4) device tracking program 200 may define a monitored zone as concentric areas (e.g., zones 410, 415, 425, and 435 of FIG. 4) around an electronic device (e.g., device 115). In other embodiments, device tracking program 200 may overlay a floor plan (e.g., map) of a shopping venue to determine which zones (e.g., zone 410, 415, 425, and 435) around device 115 are an in-store shopping area (e.g., area 405) of a merchant and which zone (e.g., area 455) is outside (e.g., area 450) the shopping area of the merchant.

In a further embodiment, device tracking program 200 includes a distance semantic (DS) that describes one or more characteristics that that are associated with a zone of device 115. In other embodiments, device tracking program 200 includes a DS that describes one or more characteristics that that are associated with a zone of POS terminal 130. For example, the zone closest to POS terminal 130 may be assigned the distance semantic characteristic of "checkout." In an alternative embodiment, device tracking program 200 utilizes a WPS (e.g., network 110 and/or multiple instance of device 115) and/or an IPS to determine the location of device 120. In some embodiment, device tracking program 200 defines zones, utilizing multiple instances of device 115 and/or other wirelessly communicating devices, such that a zone may exist independent of a specific instance of device 115. Similarly, zones based on utilizing multiple instances of device 115 and/or other wirelessly communicating devices are not constrained to circular or concentric areas.

In an embodiment, device tracking program 200 may determine a behavior of a user of device 120 in terms of distance (D), a distance semantics, and a time-of-stay (ToS) within a zone associated with device 115. In some embodiment, distance semantics may be defined with respect to zones. In some embodiments, device tracking program 200 utilizes analytics 104 to determine a behavior of a user based on studying (e.g., analyzing) the mobility of a plurality of other users. In other embodiments, device tracking program 200 utilizes analytics 104 to determine a behavior of a user based on studying (e.g., analyzing) the historical mobility data a plurality of other users.

In step 208, device tracking program 200 communicates data to incentive program 300 and obtains an incentive from incentive program 300. In one embodiment, device tracking program 200 communicates data, such as an ID for device 120; an identity for a user of device 120; and mobility data and behavior data of a user of device 120 to incentive program 300. In another embodiment, device tracking program 200 obtains one or more incentives from incentive program 300. In some embodiments, device tracking program 200 also receives an indication from incentive program 300 to delay communicating the incentive to device 120.

In decision step 210, device tracking program 200 determines whether to communicate an incentive. In an embodiment, device tracking program 200 determines to communicate an incentive to a user (Yes branch, decision step 210). In one scenario, device tracking program 200 communicates an incentive to a user via device 120 as incentives are received from incentive program 300. In another scenario, device tracking program 200 communicates a delayed incentive based on a behavior of a user. In one example, (referring to FIG. 4) device tracking program 200 receives a delayed incentive when device 120 pauses within zone 455 (e.g., window shopping distance sematic). When device tracking program 200 determines that device 120 is moving to the perimeter of zone 455, away from the entry gap in wall 440 leading to area 405 (e.g., merchant shopping area), device tracking program 200 communicates the incentive to the user via device 120.

In another embodiment, device tracking program determines not to communicate an incentive to a user (No branch, decision step 210) based on an indication from incentive program 300. In one scenario, device tracking program 200 receives an indication not to communicate an incentive from incentive program 300 based on a lack of an identity for a user. In another scenario, device tracking program 200 receives an indication not to communicate and from incentive program 300 based on one or more behaviors of a user. In one example, device tracking program 200 determines that the mobility data for device 120 indicates that a user moves quickly between instances of device 115 (e.g., following a shopping list). In another example, device tracking program 200 determines that device 120 approaches another instance of device 115 as opposed to moving toward POS terminal 130. In some scenarios, device tracking program 200 does not communicate an incentive to a user based on incentive program 300 not receiving information that identifies the user of device 120. Responsive to determining to communicate an incentive to a user (Yes branch, decision step 210), device tracking program 200 communicates an incentive to a user (step 212).

In step 212, device tracking program 200 communicates an incentive to a user. In one embodiment, device tracking program 200 communicates an incentive to a user via device 120. In one scenario, device tracking program 200 communicates an incentive via a merchant application installed on device 120. In another scenario, device tracking program 200 communicates an incentive to a user via another form of electronic communication installed on device 120, such as a text message, an e-mail, and/or a social media program. In some embodiments, device tracking program 200 cannot directly communicate an incentive to a user because the identity of the user was not ascertained. However, device tracking program 200 may communicate an incentive, linked to the ID associated with device 120, to POS terminal 130 to be available for the checkout of the user. In an alternative embodiment, device tracking program 200 communicates an incentive to a user via another electronic device that may identify device 120, such as a smart cart, an e-coupon printer, and/or electronic signage. In other embodiments, device tracking program 200 may include a map of the shopping venue indicating the locations of merchandise that is affected by an incentive, such as a location for a bundled item.

In decision step 214, device tracking program 200 determines whether a user continues shopping. In one embodiment, device tracking program 200 determines that a user continues shopping based on the user moving within a zone associated with another instance of device 115. In an alternative embodiment, device tracking program 200 determines that device 120 moves toward POS terminal 130 and communicates another incentive to device 120. In one scenario, device tracking program 200 communicates a delayed incentive to a user via device 120 to influence a user to purchase additional merchandise. In one example, device tracking program 200 communicates an incentive to bundling additional merchandise (e.g., cross-sell) based on merchandise (e.g., RFID tags) traveling with device 120. In another scenario, device tracking program 200 communicates another incentive from incentive program 300 to up-sell merchandise that a user bypasses. For example, device tracking program 200 communicates an incentive of a larger discount for a more advance model of merchandise that a user browsed in proximity to device 115. Responsive to determining that a user continues shopping (Yes branch, decision step 214), device tracking program 200 loops to continue monitoring the mobility of a user (step 204).

In another embodiment, device tracking program 200 determines that a user does not continue shopping based on the approach of device 120 to POS terminal 130. Responsive to determining that a user does not continue shopping (No branch, decision step 214), device tracking program 200 logs a purchase of a user (step 216). In some embodiments, responsive to determining that a user does not continue shopping (No branch, decision step 214), device tracking program 200 may communicate a delayed incentive to device 120 to influence a user to continue shopping.

In step 216, device tracking program 200 logs a purchase of a user. In an embodiment, device tracking program logs the purchases of a user at POS terminal 130 and updates merchant data 105 (e.g., purchase history of a user, modify inventory based on user purchase, etc.). In one embodiment, device tracking program 200 utilizes one or more incentives (e.g., QR codes, e-coupons, bar code images, etc.) communicated to device 120 to process the merchandise purchase of a user. In another embodiment, device tracking program 200 utilizes the ID of device 120 to communicate one or more incentives to POS terminal 130. In one scenario, device tracking program 200 communicates an additional incentive to POS terminal 130 that is applicable if a user purchases additional merchandise (e.g., value based, bundled items, etc.). In another scenario, device tracking program 200 communicates and additional incentive to POS terminal 130 that is applicable if a user "opts-in" (e.g., chooses to participate in a merchant program), such as installing a merchant application on device 120; provides user information and/or demographics (e.g., a user name, a user e-mail address, a user mailing address, etc.). In some embodiments, device tracking program 200 logs the purchases processes by POS terminal 130, to a purchase history associate with an ID of device 120 as opposed to the identity of a user.

Figure 3:
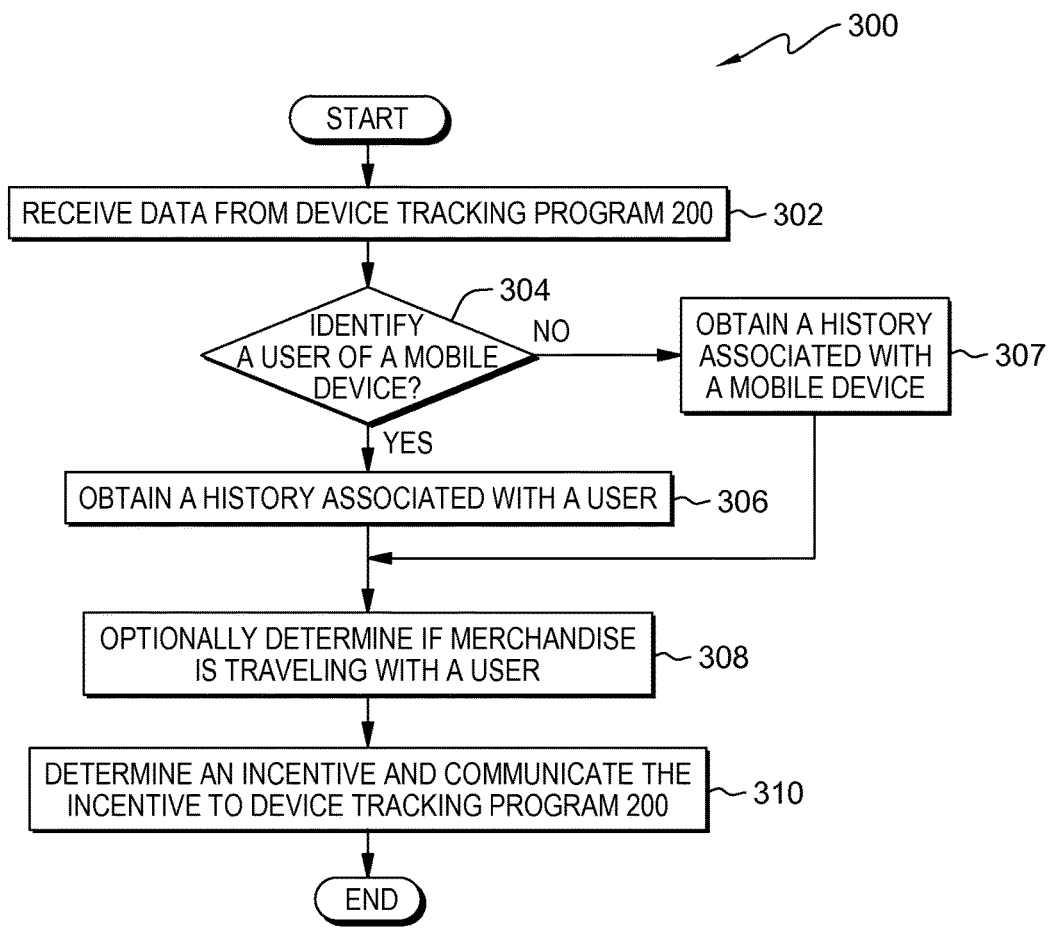
FIG. 3 depicts a flowchart of the operational steps of an incentive determination program, in accordance with an embodiment of the present invention.

FIG. 3 is a flowchart depicting operational steps for incentive program 300, a program for determining one or more incentives that affect a purchasing behavior of a user of device 120, in accordance with embodiments of the present invention.

In step 302, incentive program 300 receives data from device tracking program 200. In an embodiment, incentive program 300 receives data related to an ID for device 120 and/or an identity for a user of device 120. In another embodiment, incentive program 300 receives data related to the mobility of a user (e.g., movements of device 120) within a shopping venue of a merchant. In another embodiment, incentive program 300 receives data related to a behavior of a user within one or more zones that are monitored (e.g., in proximity to device 115).

In decision step 304, incentive program 300 determines whether a user of a mobile device is identified. In some embodiments, incentive program 300 determines an identity of a user of device 120 based on data received from device tracking program 200 (step 302). Responsive to determining an identity for a user of device 120 (Yes branch, decision step 304), incentive program 300 obtains a history associated with a user (step 306).

In step 306, incentive program 300 obtains a history associated with a user. In some embodiments, incentive program 300 obtains a history of a user from merchant data 105 based on the identity of a user (referring to FIG. 2, step 202).

Referring to decision step 304, responsive to determining an identity for a user of device 120 is not obtained (No branch, decision step 304), incentive program 300 obtains a history associated with a mobile device (step 307).

In step 307, incentive program 300 obtains a history associated with a user. In some embodiments, incentive program 300 obtains a history of device 120 from merchant data 105 based on an ID of device 120 (referring to FIG. 2, step 202).

In step 308, incentive program 300 optionally determines if merchandise is traveling with a user. In some embodiments, incentive program 300 determines which merchandise travels with a user of device 120, as opposed to inferring which merchandise is of interest based on mobility data of a user and/or a behavior determined for the user. In one embodiment, incentive program 300 determines which merchandise travels with a user based on RFID tags associated with one or more items of merchandise (e.g., attached to an item, embedded in an item, attached to packaging containing an item, etc.). In another embodiment, incentive program 300 determines which merchandise travels with a user based in input from the user. In one example, incentive program 300 determines which merchandise travels with a user based on scans of merchandise (e.g., bar codes, QR codes, etc.) by device 120. In another example, incentive program 300 determines which merchandise travels with a user based on scans of merchandise by another wirelessly communicating electronic device (e.g., a hand-held scanner, a smart cart, etc.).

In step 310, incentive program 300 determines an incentive and communicates the incentive to device tracking program 200. In one embodiment, incentive program 300 utilizes one or more capabilities of analytics 104 to determine an incentive based on the identity of a user and data received from device tracking program 200 associated with the user. In another embodiment, incentive program 300 utilizes one or more capabilities of analytics 104 to determine an incentive based on ID of device 120 and data received from device tracking program 200 associated with device 120. In some embodiments, incentive program 300 inputs: the mobility data of device 120, one or more determined behaviors of a user of device 120, and distance semantics associated with device 115 to analytics 104 to determine an incentive for a user.

Figure 4:
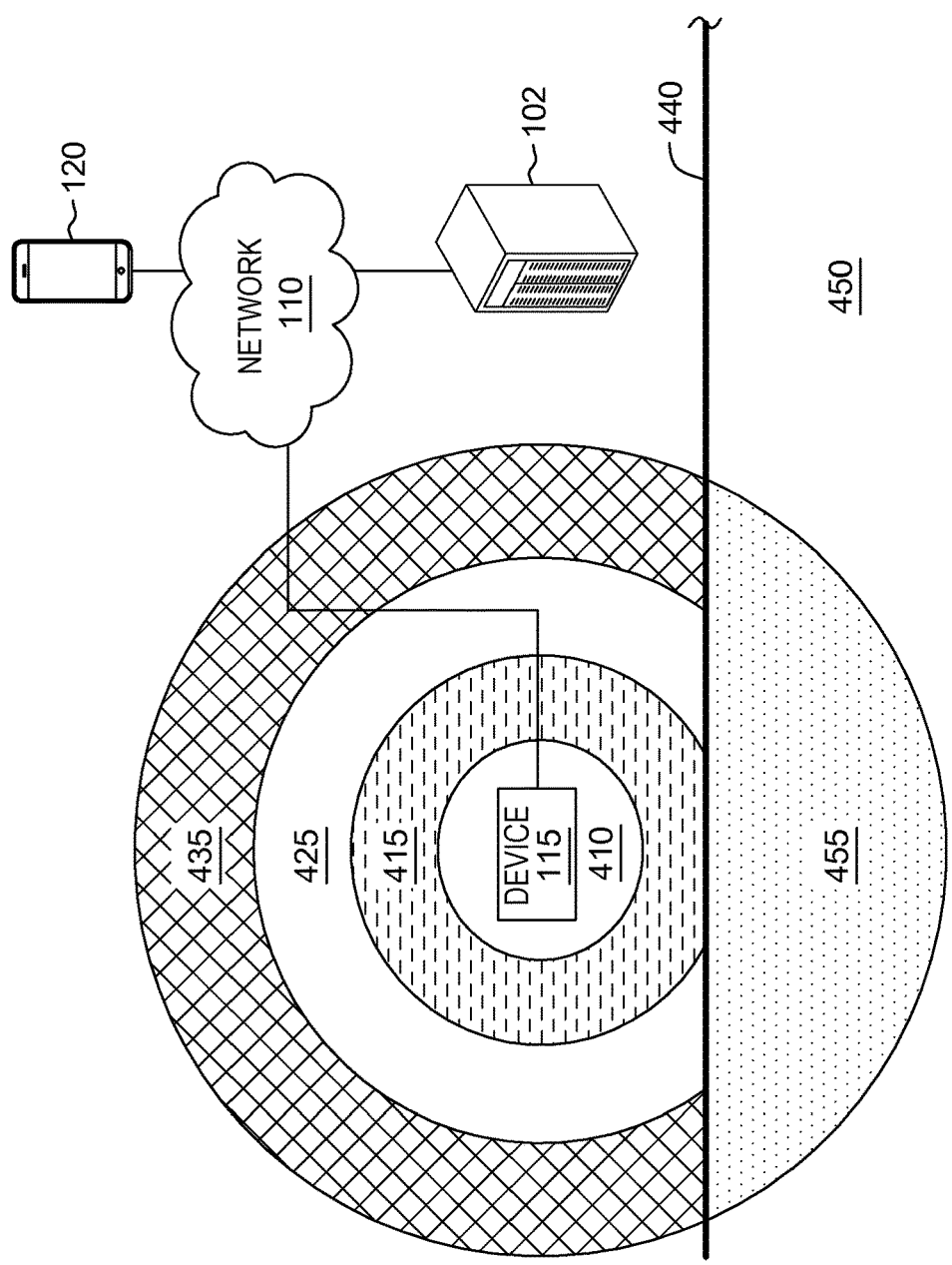
FIG. 4 an illustrative example of utilizing a transceiver to locate and monitor a mobile device and communicating the monitoring information to a computing device, in accordance with an embodiment of the present invention.

In an alternative embodiment, incentive program 300 may determine an incentive for a user based distance semantics associated with POS terminal 130. In an example, incentive program 300 determines that a user visited one or more instances of device 115; however, device 120 does not approach POS terminal 130 within a predicted period of time (e.g., historical behavior of a user, average time based on a group of similar users, etc.). In response, incentive program 300 may determine another incentive for the user of device 120 to influence the user to purchase merchandise. In another example, incentive program 300 may determine from merchant data 105 that a common behavior for a user infers comparison-shopping. Referring to FIG. 4, incentive program 300 may include a delay with an incentive that is not communicated until device 120 approaches an exit between area 405 and area 450. In addition, still referring to FIG. 4, incentive program 300 may include a second incentive with a second delay that is communicated and/or displays when device 120 returns to zone 455 and/or area 405.

In various embodiments, incentive program 300 includes inventory and/or marketing information obtained from merchant data 105 as additional inputs for analytics 104 to determine an incentive. In one example, a shopping venue may be overstocked with some items of merchandise. Rather than increasing the size (e.g., percentage) discount communicated to a customer, incentive program 300 communicates this data to analytics 104 to determine that an overstocked item may be of interest to a user of device 120. Subsequently, analytics 104 generates an incentive for the user of device 120, such as a special discount on the overstocked item, or "free item" with a minimum purchase of other merchandise. In another example, incentive program 300 determines that a shopping venue has a low stock-level for a particular item. Analytics 104 may generate a lesser incentive when a user of device 120 acquires multiple items of the low stock-level merchandise. Alternatively, if the analytics 104 determines that a user of device 120 may be near a maximum historic purchase level (e.g., dollar value), then analytics 104 may determine that the incentive is a "rain check" or extended sale for a low-stock level item of merchandise.

In an embodiment, incentive program 300 communicates the one or more incentive determined by analytics 104 to device tracking program 200. In some scenarios, incentive program 300 may format the depiction of an incentive based on criteria such as, a merchant application, a method of communicating (e.g., e-mailing, text messaging, etc.) the incentive to device 120, webpage content, etc. In other scenarios, incentive program 300 may format the depiction of an incentive based on another electronic device, such as POS terminal 130, a smart cart, and/or an e-coupon printer.

FIG. 4 an illustration depicting an example implementation of utilizing a transceiver to locate and monitor a mobile device and communicating the monitoring information to a computing device, in accordance with an embodiment of the present invention.

FIG. 4 illustrates a portion of a floor plan depicting on example of an implementation of environment 100. In this example, environment 400 includes a device 115 (e.g., a transceiver, a beacon) within a shopping venue (e.g., a retail environment) that detects (e.g., identifies) device 120 and monitors the mobility of device 120. In an embodiment, device 115 is utilized to determine the mobility data for device 120 with respect to distance, direction, speed, and ToS within one or more zones traversed by device 120. Device 115 communicates the mobility data associated with device 120 to server 102 via network 110. In an alternative implementation, environment 400 includes POS terminal 130 as opposed to device 115.

In environment 400, the shopping venue is divided by wall 440 into two areas; area 405 which included device 115 and device 120 is an in-store area (e.g., a retail environment, a shopping area) controlled by a merchant, and area 450 which is outside of the shopping area controlled by the merchant. In one embodiment, server 102 exists within area 405. In some embodiments, server 102 exists within a shopping venue of a merchant. In other embodiments, server 102 exists in a remote location and communicates with device 115 and device 120 within environment 400 via network 110.

In one embodiment, device 115 is a beacon that detects device 120. In another embodiment, device 115 is a transceiver capable detecting, identifying and establishing 2-way communication with device 120. In some embodiments, device 115 fingerprints device 120 to obtain identification information for device 120. Fingerprints can be used to fully identify or partially identify individual users or devices even when cookies are turned off. Information associated with device 120 may include: a service set identifier (SSID), a wireless communication media access control (MAC) address, a Bluetooth® MAC address, and/or a UUID. Some information associated with device 120 is secured (e.g., anonymous) unless a communication protocol is utilized that permits an authentication by device 120, such as the identity of a user (e.g., on a SIM card) of device 120.

In an embodiment, device 115 includes electronics that enable device 115 to determine the location of device 120. In some embodiments, device 115 detects and identifies device 120 at a range greater than device 115 can accurately measure the distance to device 120, such as the outside edges zone 435, and/or zone 455. Device 115 utilizes transceiver data 103 to determine the distances that are associated with zones 410, 415, 425, and 435 that surround device 115. In an embodiment, a zone may be defined with respect to an inner diameter (ID) and an outer diameter (OD). For example, zone 410 may be defined to have an ID of zero meters and an OD of one meter, zone 415 may have an ID of one meter and an OD of three meters. In another example, zone 425 has an ID of three meters and an OD of five meter; however, wall 440 acts as a restriction to zone 425 and defines an outer boundary of zone 425. Similarly, zone 435 may have an ID of five meters and an OD of eight meters; however, wall 440 constrains area 435 to form an annular sector. In a further embodiment, device 115 includes the capability (e.g., electronics, firmware, etc.) to determine one or more positions that bounds a zone such as rectangular coordinate (e.g., X/Y) or a polar coordinate (e.g., R/θ). In one example, device 115 can identify zone 415 (dashed shading), zone 425 (no shading), and zone 435 (crosshatched shading) that are within area 405 (e.g., shopping area) and bounded by wall 440. Device 115 can determine that zone 455, a circular segment (stippled shading) exists in area 450 (e.g., outside of the shopping area). In another example, device 115 may download information from transceiver data 103 that indicates that a portion of zone 435 includes clearance merchandise. The clearance merchandise is located in the portion of zone 435 from an angle of zero degrees (e.g., parallel to wall 440), counterclockwise to wall 440 (e.g., lower right section). In another embodiment, device 115 is a transceiver that can wirelessly communicate incentive offers (e.g., coupons) that are generated by server 102 to device 120.

In an embodiment, zone 410 (no shading) includes merchandise associated to device 115. In some embodiments, device 115 can detect merchandise (not shown) that include RFID tags (not shown) and can utilize NFC to determine which merchandise is in proximity and moving with (e.g., accompanying) device 120. Device 115 may communicate to server 102 which one or more items of merchandise may be accompanying device 120. During subsequent stops of a user of device 120 by other instances of device 115, each instance of device 115 may determine which merchandise is accompanying device 120. In other embodiments, a merchant application (not shown) executing on device 120 may utilize NFC to determine which items of merchandise that are RFID tagged, are traveling with device 120. Device 120 communicates the information associated with the RFID tagged items of merchandise to server 102. In various embodiments, device 115 may determine that other items of merchandise that are RFID tagged exist within zones 415, 425, and 435.

In an embodiment, each zone surrounding device 115 is further identified by a distance sematic defined by a merchant and stored in transceiver data 103. Examples of distance semantics that are defined for a zone include: regular price area (zone 415), promotional area (zone 425), browsing area (zone 435), and window shopping area (zone 455) based on the merchandise available in the area. In some embodiments, merchandise designations (e.g., regular price, sale priced, clearance prices) may not be segregated into concentric zones surrounding device 115.

Device 120 is mobile and can traverse within areas 405 and/or 450. In an embodiment, device 115 utilized by a WPS to detect device 120 within area 405 or area 450. In one scenario, device 115 detects device 120 and determines that based on a DoA that device 120 exists within area 450 and enters zone 455 which includes a distance sematic that identifies zone 455 as a window shopping area. Device 115 communicates the location of device 120 and a period of time that device 120 stays within zone 455 to server 102. In some embodiments, server 102 determines an incentive and communicates the incentive (e.g., as a text message, as an e-mail, via a merchant application, etc.) to device 120 to influence a user to enter shopping area 405. In another scenario, device 115 detects device 120 as determines that based on a DoA that device 120 exists within area 405 (e.g., a shopping area) and enters zone 435 which includes a distance sematic of a browsing area.

In an alternative embodiment, environment 400 may be described with respect to POS terminal 130 as opposed to device 115. For example, in zone 410 (e.g., distance sematic of checkout) a cashier processes the merchandise of a user of device 120 and applies one or more incentive communicated from server 102. In some instances, server 102 communicates incentives to device 120. In other instances, server 102 communicates incentives to POS terminal 130. Zone 415 (e.g., distance sematic of in-line) may include merchandise (e.g., candy, magazines, etc.) displayed to induce impulse purchases. Zone 425 may be assigned a distance sematic of "contemplation" where a user of device 120 may review merchandise traveling with the user prior to determining to complete a purchase. Zone 435 may be assigned a distance semantic of "continued browsing."

Figure 5:
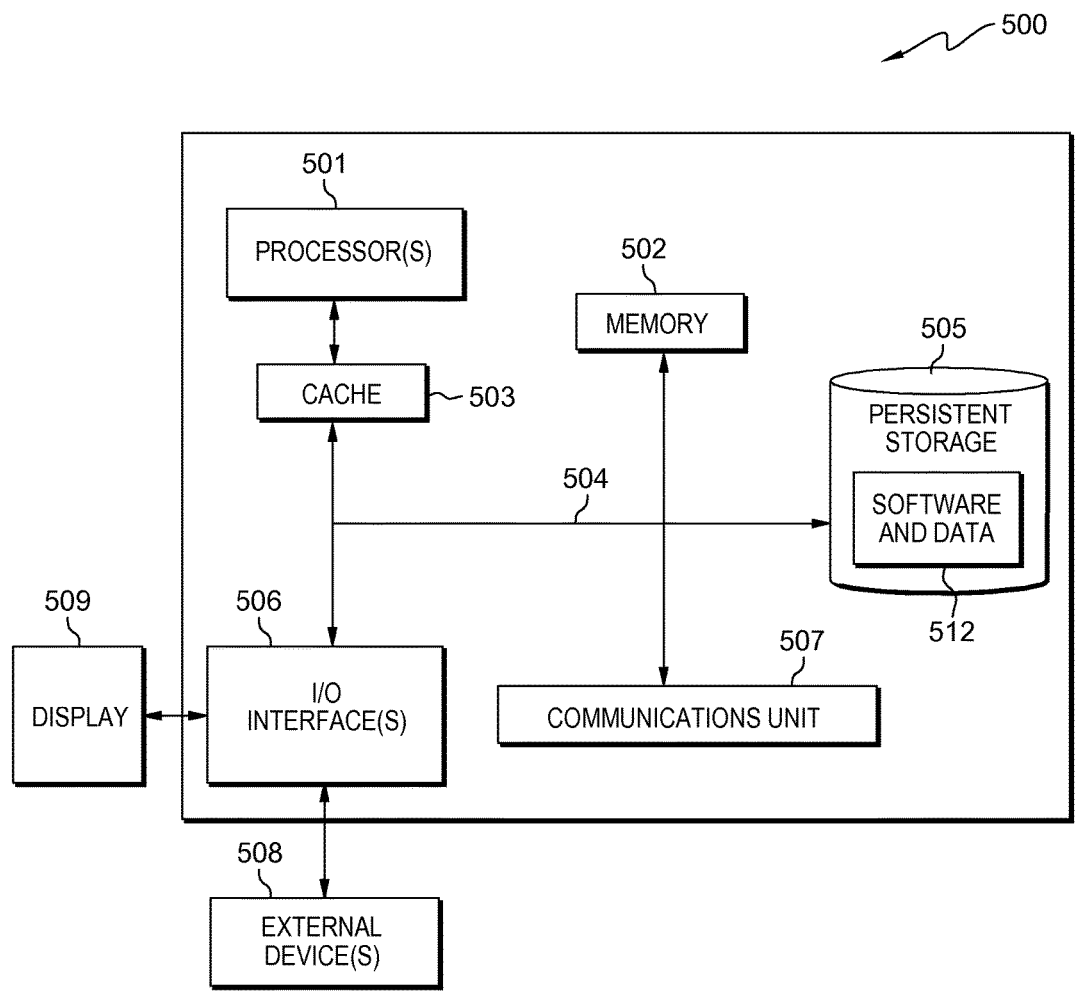
FIG. 5 is a block diagram of components of a computer, in accordance with an embodiment of the present invention.

FIG. 5 depicts computer system 500, which is representative of server 102, device 115, and device 120, and POS terminal 130. Computer system 500 is an example of a system that includes software and data 512. Computer system 500 includes processor(s) 501, memory 502, cache 503, persistent storage 505, communications unit 507, I/O interface(s) 506, and communications fabric 504. Communications fabric 504 provides communications between memory 502, cache 503, persistent storage 505, communications unit 507, and I/O interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 512 are stored in persistent storage 505 for access and/or execution by one or more of the respective processor(s) 501 via cache 503 and one or more memories of memory 502. With respect to server 102, software and data 512 includes transceiver data 103, analytics 104, merchant data 105, device tracking program 200, incentive program 300, and various programs (not shown). With respect to device 115, software and data 512 includes various information and programs (not shown). With respect to device 120, software and data 512 includes respective user information 121, user interface (UI) 122, and various programs (not shown).

Communications unit 507, in these examples, provides for communications with other data processing systems or devices, including resources of server 102, device 115, device 120, and POS terminal 130. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Software and data 512 used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for managing aspects of an area associated with a merchant;

the computer program product comprising a computer readable storage medium having program code embodied therein, the program code readable/executable by a computer processor to:

detect a first electronic device within a retail environment that includes the area related to the merchant, wherein the first electronic device is wirelessly detected utilizing at least one instance of a second electronic device that identifies information associated with the first electronic device;

identify a plurality of instances of the second electronic device and respective locations of the instances of the second electronic device associated with the area related to the merchant, wherein a distance associated with at least one instance of the second electronic device wirelessly detects the first electronic device extends beyond the area related to the merchant;

determine a behavior associated with the first electronic device based on movement of the first electronic device within the retail environment with respect to the area related to the merchant by monitoring the first electronic device utilizing one or more instances of the second electronic device;

identify data associated with the merchant, wherein the identified data associated with the merchant includes a floorplan of the area related to the merchant and inventory information associated with the merchant;

dynamically determining a set of zones that electronically partition the area related to the merchant based on the identified plurality of instances of the second electronic device, the respective locations the instances of the second device, and a change to the inventory information associated with the merchant, wherein a zone of the set of zones is defined relative to one or more instances of the second electronic device, wherein at least a second zone is included within a first zone; and wherein electronically partitioning the area related to the merchant into the determined set of zones further comprises program code to:

identify respective instances of the second electronic device to update based on the identified information associated with the merchant;

store updated information related to determining boundaries associated with the set of zones that electronically partition the area related to the merchant within the identified respective instances of the second electronic device;

initiate execution of an algorithm within the identified respective instances of the second electronic device to update the boundaries that electronically partitions the area related to the merchant into the set of zone; and determine a first marketing incentive based on the determined behavior associated with the first electronic device, the identified inventory information associated with the merchant, and the identified data associated with the merchant, and further based on information associated with the first electronic device moving among two or more zones.

2. The computer program product of claim 1, wherein program code to wirelessly detect the first electronic device the program code further being readable/executable by a computer processor to:

determine an identity of the first electronic device utilizing the second electronic device based on information obtained from the first electronic device, wherein the first electronic device corresponds to a user.

3. The computer program product of claim 1, wherein the identified data associated with the merchant further includes:

historical information;

one or more algorithms that determine the set of zones related to the area of the merchant;

one or more conditions that affect communicating a marketing incentive to the first electronic device;

information related to one or more instances of the second electronic device within the area related to the merchant and associated with the floorplan; and information related to a distribution of items of merchandise of the merchant relative to the determined set of zones.

4. The computer program product of claim 1, wherein program code to determine the behavior associated with the first electronic device further comprises program code further being readable/executable by a computer processor to:

track a motion of the first electronic device relative to one or more instances of the second electronic device, wherein the motion includes:

(i) distance of the first electronic device relative to the one or more instances of the second electronic device;

(ii) direction of the motion of the first electronic device relative to the one or more instances of the second electronic device;

(iii) a speed of the motion of the first electronic device relative to the one or more instances of the second electronic device; and (iv) duration of the motion of the first electronic device within the zone defined relative to the one or more instances of the second electronic device; and analyze the motion of the first electronic device based on the identified data associated with the area related to the merchant, behavioral analytics, and one or more merchant algorithms.

5. The computer program product of claim 2, the program code further being readable/executable by a computer processor to:

determine an identity of the user of the first electronic device;

determine a second marketing incentive based, at least in part, on the identity of the user of the first electronic device and the identified data associated with the merchant; and communicate, to an instance of the second electronic device, at least one of the first marketing incentive and the second marketing incentive, for communication to the first electronic device.

6. The computer program product of claim 2, the program code further being readable/executable by a computer processor to:

determine that an identity of the user of the first electronic device cannot be identified;

determine a third marketing incentive based, at least in part, on the identity of the first electronic device and the identified data associated with the merchant; and communicate at least one of the first marketing incentive and the third marketing incentive to at least one of the first electronic device and a third electronic device that is associated with the merchant, and wherein the third electronic device includes one or more of:

an automated checkout station that can wirelessly detect the first electronic device;

a point-of-sales terminal that can wirelessly detect the first electronic device; and a customer service representative that is assigned the third electronic device that can wirelessly detect the first electronic device.

7. A computer system for managing aspects of an area associated with a merchant, the computer system comprising:

one or more computer processors;

one or more computer readable storage media; and program code stored on the computer readable storage media having program code embodied therein, the program code readable/executable for execution by at least one of the one or more computer processors, comprises the program code to:

detect a first electronic device within a retail environment that includes the area related to the merchant, wherein the first electronic device is wirelessly detected utilizing at least one instance of a second electronic device that identifies information associated with the first electronic device;

identify a plurality of instances of the second electronic device and respective locations of the instances of the second electronic device associated with the area related to the merchant, wherein a distance associated with at least one instance of the second electronic device wirelessly detects the first electronic device extends beyond the area related to the merchant;

determine a behavior associated with the first electronic device based on movement of the first electronic device within the retail environment with respect to the area related to the merchant by monitoring the first electronic device utilizing one or more instances of the second electronic device;

identify data associated with the merchant, wherein the identified data associated with the merchant includes a floorplan of the area related to the merchant and inventory information associated with the merchant;

dynamically determining a set of zones that electronically partition the area related to the merchant based on the identified plurality of instances of the second electronic device, the respective locations of the instances of the second device, and a change to the inventory information associated with the merchant, wherein a zone of the set of zones is defined relative to one or more instances of the second electronic device, wherein at least a second zone is included within a first zone; and wherein electronically partitioning the area related to the merchant into the determined set of zones further comprises program code to:

identify respective instances of the second electronic device to update based on the identified information associated with the merchant;

store updated information related to determining boundaries associated with the set of zones that electronically partition the area related to the merchant within the identified respective instances of the second electronic device;

initiate, execution of an algorithm within the identified respective instances of the second electronic device to update the boundaries that electronically partitions the area related to the merchant into the set of zone; and determine a first marketing incentive, based on the determined behavior associated with the first electronic device, the identified inventory information associated with the merchant, and the identified data associated with the merchant, and further based on information associated with the first electronic device moving among two or more zones.

8. The computer system of claim 7, wherein program code to wirelessly detect the first electronic device the program code further being readable/executable by a computer processor to:

determine an identity of the first electronic device utilizing the second electronic device based on information obtained from the first electronic device, wherein the first electronic device corresponds to a user.

9. The computer system of claim 7, wherein the identified data associated with the merchant further includes:

historical information;

one or more algorithms that determine the set of zones related to the area of the merchant;

one or more conditions that affect communicating a marketing incentive to the first electronic device;

information related to one or more instances of the second electronic device within the area related to the merchant and associated with the floorplan; and information related to a distribution of items of merchandise of the merchant relative to the determined set of zones.

10. The computer system of claim 7, wherein program code to determine the behavior associated with the first electronic device further comprises program code further being readable/executable by a computer processor to:

track a motion of the first electronic device relative to one or more instances of the second electronic device, wherein the motion includes:

(i) distance of the first electronic device relative to the one or more instances of the second electronic device;

(ii) direction of the motion of the first electronic device relative to the one or more instances of the second electronic device;

(iii) a speed of the motion of the first electronic device relative to the one or more instances of the second electronic device; and (iv) duration of the motion of the first electronic device within the zone defined relative to the one or more instances of the second electronic device; and analyze the motion of the first electronic device based on the identified data associated with the area related to the merchant, behavioral analytics, and one or more merchant algorithms.

11. The computer system of claim 8, the program code further being readable/executable by a computer processor to:

determine an identity of the user of the first electronic device;

determine a second marketing incentive based, at least in part, on the identity of the user of the first electronic device and the identified data associated with the merchant; and communicate, to an instance of the second electronic device, at least one of the first marketing incentive and the second marketing incentive, for communication to the first electronic device.

12. The computer system of claim 8, the program code further being readable/executable by a computer processor to:
   determine that an identity of the user of the first electronic device cannot be identified;
   determine a third marketing incentive based, at least in part, on the identity of the first electronic device and the identified data associated with the merchant; and
   communicate at least one of the first marketing incentive and the third marketing incentive to at least one of the first electronic device and a third electronic device that is associated with the merchant, and wherein the third electronic device includes one or more of:
      an automated checkout station that can wirelessly detect the first electronic device;
      a point-of-sales terminal that can wirelessly detect the first electronic device; and
      a customer service representative that is assigned the third electronic device that can wirelessly detect the first electronic device.

13. The computer program product of claim 1, wherein the plurality of instances of the second electronic device are transceivers that communicate wirelessly with the first electronic device and are a portion of a positioning system of the merchant utilized for real-time monitoring of an electronic device of a user.

14. The computer program product of claim 1, wherein dynamically modifying one or more zones includes changing a size, one or more boundaries corresponding to one or more zones, a description, and one or more parameters assigned to the identified respective instances of the second electronic device to update.

15. The computer system of claim 7, wherein the plurality of instances of the second electronic device are transceivers that communicate wirelessly with the first electronic device and are a portion of a positioning system of the merchant utilized for real-time monitoring of an electronic device of a user.

16. The computer system of claim 7, wherein dynamically modifying one or more zones includes changing a size, one or more boundaries corresponding to one or more zones, a description, and one or more parameters assigned to the identified respective instances of the second electronic device to update.

* * * * *